(12) United States Patent
Gava et al.

(10) Patent No.: US 9,024,995 B2
(45) Date of Patent: May 5, 2015

(54) VIDEO CALLING USING A REMOTE CAMERA DEVICE TO STREAM VIDEO TO A LOCAL ENDPOINT HOST ACTING AS A PROXY

(75) Inventors: Fabio Gava, Ladera Ranch, CA (US); Praveen Kashyap, Irvine, CA (US); Shiang-Feng Lee, Irvine, CA (US); Fei Xie, Irvine, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 201 days.

(21) Appl. No.: 13/571,192

(22) Filed: Aug. 9, 2012

(65) Prior Publication Data
US 2014/0043424 A1   Feb. 13, 2014

(51) Int. Cl.
H04N 7/14   (2006.01)
(52) U.S. Cl.
CPC ........................................ *H04N 7/14* (2013.01)
(58) Field of Classification Search
CPC ......... H04N 7/14; H04N 7/141; H04N 7/142; H04N 7/147; H04N 7/148; H04N 7/15
USPC ........................................... 348/14.01–14.16
See application file for complete search history.

(56) References Cited

U.S. PATENT DOCUMENTS

| 6,732,183 | B1 | 5/2004 | Graham |
| 7,310,680 | B1 | 12/2007 | Graham |
| 2005/0111438 | A1* | 5/2005 | Kim .............................. 370/352 |
| 2007/0052801 | A1* | 3/2007 | Shimamura .................... 348/140 |
| 2007/0273752 | A1* | 11/2007 | Chambers et al. ......... 348/14.02 |
| 2008/0117282 | A1* | 5/2008 | Cho .............................. 348/14.1 |
| 2009/0174763 | A1* | 7/2009 | Bengtsson et al. ......... 348/14.08 |
| 2010/0045772 | A1* | 2/2010 | Roo et al. ................... 348/14.01 |
| 2010/0138480 | A1 | 6/2010 | Benedetto |
| 2011/0249086 | A1* | 10/2011 | Guo et al. ................... 348/14.12 |
| 2011/0273526 | A1* | 11/2011 | Mehin et al. ............... 348/14.01 |
| 2013/0088562 | A1* | 4/2013 | Hong et al. ................. 348/14.07 |
| 2014/0043358 | A1* | 2/2014 | Wang ............................. 345/619 |
| 2014/0253674 | A1* | 9/2014 | Grondal et al. ............ 348/14.08 |

OTHER PUBLICATIONS

Skype, "Help for Skype: Can I connect to Skype through a proxy server?", Nov. 15, 2011, downloaded Apr. 9, 2013, 5 pages, Skype Technologies, USA.
European Search Report dated Jun. 24, 2014 for European Patent Application No. 13179182.4 from European Patent Office, pp. 1-6, Munich Germany.

* cited by examiner

*Primary Examiner* — Melur Ramakrishnaiah
(74) *Attorney, Agent, or Firm* — Sherman IP LLP; Kenneth L. Sherman; Steven Laut

(57) ABSTRACT

A remote camera device is enabled to be used as a source of a video stream in a video call where the local endpoint host in the call, such as a TV, functions as a local endpoint proxy. The TV receives the video stream and transmits it to a remote endpoint host (the other end of the video call) using a conventional video call application. A TV without a camera is able to function as a local endpoint proxy in a video call with a remote device. In another scenario, the TV discovers and connects to a remote camera device. The remote camera, such as a cell phone, streams video to the TV which functions as a local endpoint proxy in the video call. The TV transmits the video to the device at the other end of the call.

22 Claims, 6 Drawing Sheets

ND A REMOTE
VIDEO CALLING USING A REMOTE CAMERA DEVICE TO STREAM VIDEO TO A LOCAL ENDPOINT HOST ACTING AS A PROXY

TECHNICAL FIELD

The present invention relates generally to software and computing devices. More specifically, it relates to video calling software and communication between remote cameras and computing devices.

BACKGROUND OF THE INVENTION

Video chat applications have evolved from a basic (local) peer to peer model, through stages of server-based relay communication, and finally through modern SIP services that initialize a peer-to-peer session through the help of an external server. Throughout this evolution, however, the target use-case was simply a user in front of a device, talking with another user in front of another device. A more versatile solution is desirable.

For certain newer devices used in video chat, such as the television, there is a limitation. Because the device is heavy and fixed, it is either impossible or burdensome to provide an immersive experience that allows the user to show/see objects outside of the field of view of the camera fixed or attached to the TV. Some existing solutions to alleviate this issue are using PZT (pan-zoom-tilt) cameras to allow the camera to pivot automatically; these are costly and precarious on a modern thin TV. Alternatively, using a SW-FOV (super-wide field of view) camera provides the ability to virtually zoom the camera; but these appear blurry on high-resolution displays and either cause lens distortion from the "fish-eye" lens or are computationally heavy on the host device (e.g. TV) to fix these issues.

It would be desirable to have an alternative to providing a full-field of view for a fixed device, even greater and with more freedom than the current state-of-the-art.

SUMMARY OF THE INVENTION

General aspects of the invention include, but are not limited to methods and apparatus, for enabling a remote camera device to be used as a source of a video stream in a video call where the local endpoint host, such as a TV or a computer, functions as a local endpoint proxy which receives the video stream and transmits it to a remote endpoint host using a conventional video call (chat) application. In one scenario, a TV without an internal or attached camera is able to function as a local endpoint proxy in a video call with a remote device. The TV connects via a local network (e.g., via UPnP) to a remote camera device which a caller can use to capture video. This video is streamed to the TV which transmits the video to the other device (typically over the Internet) on the video call using a known video chat application, such as Skype. In this manner, a TV without a camera can be used to make a video call. In another scenario, the TV has a camera which can transmit video to the remote endpoint device (i.e., to the other end of the video call), but the local caller wants to show video that is outside the field of view of the TV camera. In this case the TV discovers and connects to a remote camera device. The remote camera, such as a cell phone, tablet, or surveillance camera, streams video to the TV which, as noted, now functions as a local endpoint proxy in the video call. The TV then transmits or relays the video to the device at the other end of the call. In this manner, video from outside the FOV of the TV camera can be sent during the video call.

BRIEF DESCRIPTION OF THE DRAWINGS

The invention and the advantages thereof may best be understood by reference to the following description taken in conjunction with the accompanying drawings in which.

In the drawings, like reference numerals are sometimes used to designate like structural elements. It should also be appreciated that the depictions in the figures are diagrammatic and not to scale.

DETAILED DESCRIPTION OF THE INVENTION

Methods and systems for enabling users to engage in a video call where one or both ends of the call use a remote camera device as a video source are described in the various figures. Conventional video call applications, also referred to as video chat, typically have two endpoints that are connected over a public network, in most cases the Internet. The present invention describes two primary embodiments: one where an endpoint host does not have a camera and one where the host does have a camera. In the embodiment where the host does have a camera, the camera is often fixed and can only capture images that are within its field of view. In another embodiment, the host device acts as a proxy for video originating from a remote camera device, such as a smart phone, tablet, camcorder, or surveillance camera. The host device receives the video stream and redirects it to the other endpoint host device. A typical scenario is shown in FIG. 1.

Figure 1:
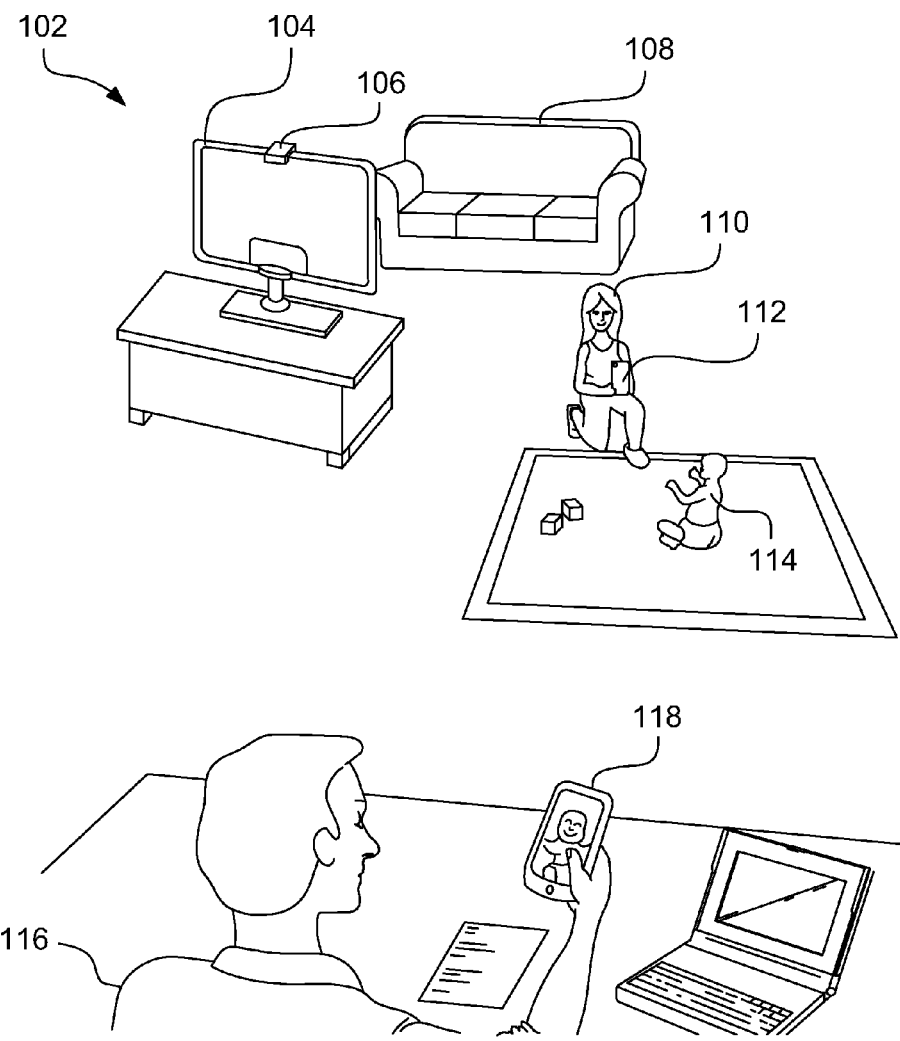
FIG. 1 is an illustration showing two environments between which a video call is being made.

FIG. 1 is an illustration showing two endpoint environments in a video call. One environment is a room 102 at a home where there is a TV 104 with a camera 106 facing a couch 108. In another embodiment, TV 104 does not have a built-in or external (attached) camera. A user 110 is holding a cell phone 112 and taking a video of a child 114. The video is transmitted to TV 104 via a local area network in the home. Cell phone 112 may be found using the network protocol in the home, such as UPnP. At the other end of the video call is a user 116 holding a cell phone 118 which functions as the other endpoint host. In another embodiment, the remote camera device 112 finds or discovers TV 104 also using a network protocol and performing the video streaming functionality. User 116 is viewing video originating from the user 110 cell phone 112, not from the camera that is attached to or part of the TV.

In this manner, the video source for the call can be from any location within the local network in the home, such as from a different part of a room or from another room that are clearly outside the field-of-view of the camera fixed to the endpoint host in the video call which covers essentially couch 108. TV 104 may not have a camera (fixed or external) and, as such, would not be suitable for a video call, but can act as a proxy for a remote camera device that connects to the TV via the local network, thereby effectively enabling the TV to function as an endpoint host in a video call.

FIG. 1 shows one scenario in which the present invention can be used, namely, in the home. Of course, one can imagine numerous other environments and scenarios where the present invention can be used, keeping in mind that the endpoint host device does not have to be a TV, but can be any device that can implement a video call over the Internet (or other public network) and can connect to a local network, such as a game console or an Internet appliance. The endpoint host devices 104 (TV) and 118 (cell phone) are clients of one another in the video call environment. Remote camera device 118 may be one or more of several different types of devices such as a tablet, a slate computer, a digital camera capable of streaming video, or even a fixed camera that does not require manual handling, such as a surveillance camera. The described embodiments show a cell phone (or "smart phone") but only for illustrative purposes. They may be of any type that supports the appropriate client video chat application that is resident on each device and is able to establish communication between the devices for transmitting data and video.

Figure 2:
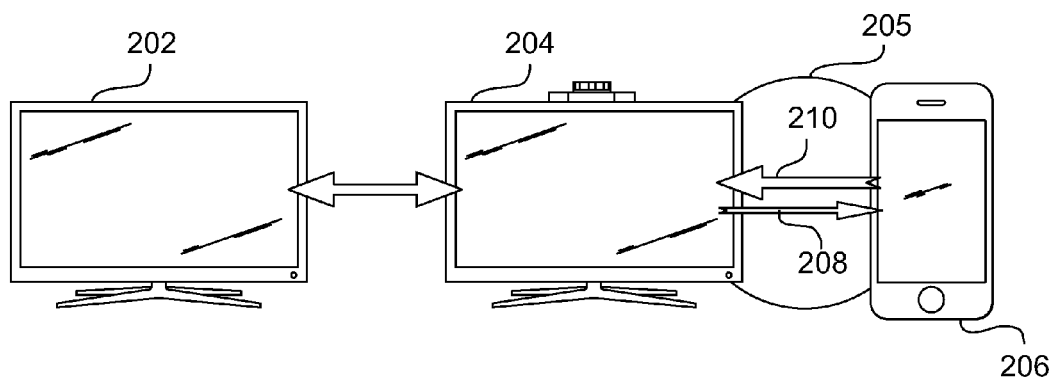
FIG. 2 is a high-level network diagram showing one configuration of a video call in accordance with one embodiment.

FIG. 2 is a high-level network diagram showing one configuration of a video call in accordance with one embodiment. A video call typically has two endpoint host devices although it may have more. To illustrate the present invention, one endpoint host device is referred to as a remote endpoint host, shown as device 202. In FIG. 2, it is shown as a TV. In most cases, device 202 will have an attached or external camera (not shown). It may not, in which case the video call would only have video in one direction. Device 202 may be a mobile device, such as a tablet computer or a cell phone. It is connected via an unknown or public network, in most cases the Internet, to another endpoint host device shown as device 204. This device is referred to as a local endpoint host device. An optional session initiation server on the Internet may be used to enable the video call. This SIP (not shown) or an accessible proxy host facilitates the video call according to the appropriate protocol for the video call (chat) system being used.

Local endpoint host device 204 uses a local network or subnet 205 to communicate with a remote camera device 206. The local network (LAN) 205 may be a home network or a network in an office environment where remote camera 206 is discoverable by local endpoint host device 204. As noted above, the remote camera device (tablet, camera, cell phone, etc.) discovers or finds the TV. Control instructions (data) 208 are sent to camera device 206 as shown by arrow 208. Remote camera 206 transmits video to device 204 as shown by wider arrow 210 to indicate that a larger volume of data (video) goes from the remote camera to local device 204. Device 204 also has a client application that can support communication with remote camera devices so that it can serve as an endpoint proxy device to accept data from the local network and transmit it over the connection to the other end of the call. As noted, device 204 may have a locally connected or attached camera itself, although this is not required in order to implement the present invention. Indeed, one of the advantages of the invention is that a video call can use an endpoint host device that does not have its own camera and instead uses a remote camera device that connects to it over a local network to provide a video source.

Figure 3:
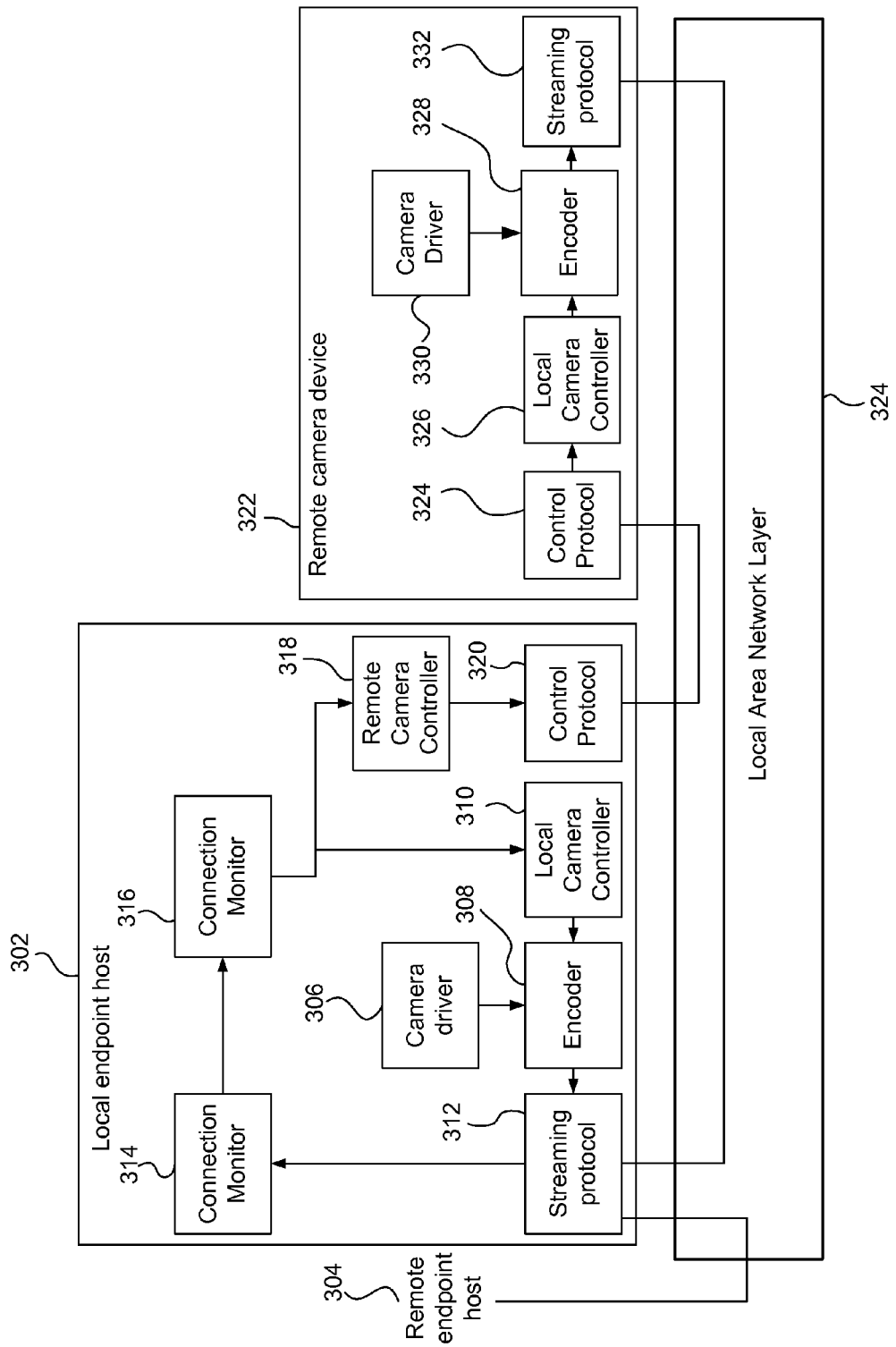
FIG. 3 is a block diagram showing relevant components in a local endpoint host device and a remote camera device connected via a local area network layer.

FIG. 3 is a block diagram showing relevant components in a local endpoint host device and a remote camera device connected via a local area network layer. A local endpoint host device 302 has modules related to performing a video call between it and a remote endpoint host 304. In the embodiment shown in FIG. 3, local endpoint host 302 has a built-in or attached camera. Modules related to the camera include a camera driver 306, an encoder 308, and a local camera controller 310. These modules perform conventional functions for camera operation. In particular, encoder 308 encodes the raw video received from camera driver 306 according to parameters (codec, resolution, bit rate, frame rate) given to it by the video chat protocol being used on device 302. Encoder 308 transmits video to a streaming protocol module 312 which has at least two primary functions. Module 312 transmits video to remote endpoint host 304 over the Internet or other suitable wide area network. Module 312 also provides information on network conditions to a connection monitor module 314.

One of the functions of module 312 is enabling the actual video chat protocol being used on hosts 302 and 304, for example, Skype. Whatever the video program being used, streaming protocol module 312 is responsible for executing it on host device 302. Another function of module 312 is ensuring the smooth playback of video on the device among other functions. To accomplish this, it unpacks the video stream and updates or replaces data in the video blocks, such as timestamps, to account for clock differences between devices 302 and 322, which can cause disruptions in the playback of video. It also detects other factors relating to the video call, such as changes in bandwidth between local and remote host devices. Connection monitor module 314 receives information on network connection conditions (latency, bandwidth, packet loss) between the two devices (typically the Internet) and prepares instructions on how to encode the video. For example, the module creates commands to decrease or increase resolution, modify bit and frame rates.

As noted above, local endpoint device 302 has a camera. A remote camera can still be used with the device to obtain video from outside the field-of-view of the camera on local host device 302, as illustrated in FIG. 1. Thus, a video chat may involve two cameras providing two different sources of video. As described in more detail below, a user can switch between these two cameras (the local and remote cameras). A camera manager module 316 functions as a toggle component for switching between the local and remote cameras. It receives instructions on how to encode with respect to network conditions. Module 316 transmits control data to local camera controller 310 and to a remote camera controller 318.

A control protocol module 320 is used to communicate instructions 323 to a remote camera device 322, specifically to remote camera control protocol module 324. It instructs remote camera 322 what format the video obtained by the camera and transmitted to local host 302 should be in. This communication is done via a local area network layer 324. As can be seen from the modules in local endpoint host 302, control data generally flows from connection monitor 314 which monitors the link for the video call to camera manager module 316 to the camera controllers 310 and 318 to control protocol 320 before it leaves local host device 302.

In one embodiment, control data or instructions 323 from endpoint host 302, specifically control protocol module 320 consists of two parts: remote camera device control (e.g., UPnP device/service) and video stream control (RTSP). With respect to remote camera device control, a UPnP device is created for the remote camera. The local endpoint host 302, such as a TV, follows standard UPnP device discovery to discover the camera device. In remote camera device 322, three control messages are defined: CONNECT, AUTHORIZE, and DISCONNECT. After discovery and remote camera device 322 connects to local endpoint host 302, host 302 can control the audio/video stream from remote camera device 322 by using RTSP protocol. In one embodiment there are four control messages: SETUP, PLAY, SET_PARAMETER, and TEARDOWN.

On remote camera device 322 there is a remote control protocol module 324 that receives instructions from module 320 via LAN 325. As noted, the data received is generally related to video formatting and encoding for remote camera 322. Other components on remote camera device 322 are conventional components for a camera and include a local camera controller 326 that receives instructions from remote control protocol module 324. Controller 326 sends instructions to an encoder 328 which, in one embodiment, performs the same encoding as local endpoint host encoder 308 does. It is preferable that the video obtained by remote camera 322 be encoded to a format that is compatible or acceptable with the video call protocol and logic resident on local host 302. Encoder 328 obtains video from remote camera driver 330. The video is encoded to an acceptable format and is transmitted to streaming protocol module 332 from where it is transmitted to streaming protocol module 312 on local host device 302.

As noted, the remote camera device is local to the local endpoint host in that it can connect to or be discoverable on the same network/subnet as the local host or is within the same accessible network. The remote camera supports a remote camera application or other resident code so that it can communicate with the local endpoint host, which may be referred to more descriptively as an endpoint proxy. In some embodiments, the remote camera application may be one or more pre-existing protocols supported by the device such as UPnP, Bonjour HLS, RTP/RTSP or the like.

As noted, the local endpoint host functions as an endpoint proxy specifically in the context of a video call because the existence of both an incoming channel (from the remote camera device) and an outgoing channel (to the remote endpoint host) is required for it to function as an endpoint proxy. Upon termination of either the incoming or outgoing connection from the local endpoint host, the endpoint host ceases from functioning as an endpoint proxy. However, the termination of one connection does not terminate the other. If one connection is terminated, the endpoint proxy falls back to basic functionality as a local endpoint host for the video call. For example, if the incoming channel or connection (from the remote camera device) is terminated, the local host device falls back to using the locally connected camera device, if available, for streaming video or falls back to audio-only mode. In another example, if the outgoing connection (to the remote host device) is terminated, the remote camera device may continue streaming to the local device, though no data will be transmitted given that the video call was essentially terminated. If a new video call is initiated, streaming may resume from the remote source.

Figure 4:
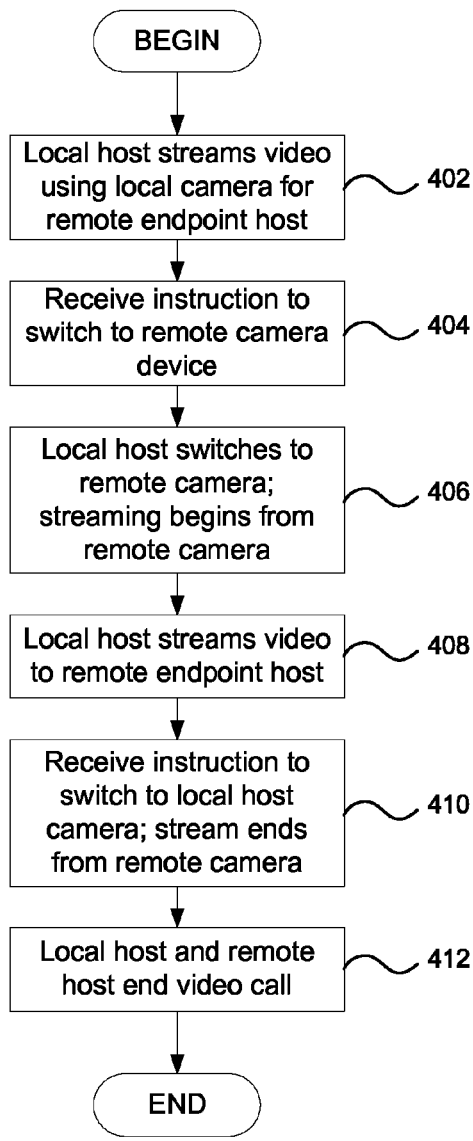
FIG. 4 is a flow diagram of a process for a video call with a local endpoint proxy having an internal or attached camera in accordance with one embodiment.
Figure 5:
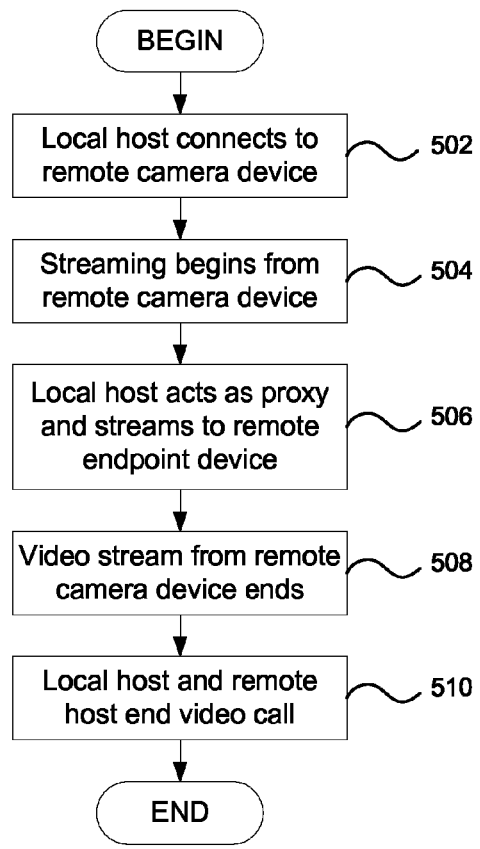
FIG. 5 is a flow diagram of a process for a video call with a local endpoint proxy that does not have an internal or attached camera in accordance with one embodiment.

FIG. 4 is a flow diagram of a process for a video call with a local endpoint proxy having an internal or attached camera in accordance with one embodiment. It describes processes that take place in the scenario shown in FIG. 1 where TV 104 has camera 106, as well as those shown in FIGS. 2 and 3 which show local endpoint hosts having their own cameras. FIG. 5 below describes a process for a video call where the local endpoint proxy does not have its own camera. The process in FIG. 4 begins with a video chat between a local endpoint host and a remote host already in progress. At step 402 the local endpoint host, such as a TV, transmits video using its local (resident) camera over a public network to a remote endpoint host. As shown in FIG. 1, the local camera may have a limited FOV thereby limiting the video that can be sent to the remote host. The user at the local host end wants to show something to the other (remote) user that is outside the FOV of the local camera. In one embodiment, the local user launches an app on a remote camera device, such as a smart phone, and then enters instructions on local host device, such as a TV, confirming that she wants to use the remote camera. This aspect of the user experience and details of the interface are described in FIG. 6. In another embodiment the local user may launch the app on a remote camera device, search for the TV and take over the video streaming. In another embodiment the remote camera device could be fixed in another location, for example, a surveillance camera.

At step 404 the local endpoint host receives instructions to switch to a particular remote camera device selected by the local user (there may be more than one remote camera device discovered by the local host device). This instruction may be initially received or processed by connection monitor 314 or camera manager 316. At step 406 the local host device switches from the local camera to the selected remote camera. This toggling function is performed by camera manager module 316 which will now send instructions to remote camera controller module 318 instead of to local camera controller module 310 which sends control instructions that eventually reach the camera operation modules (modules 326, 328 and 332) on the remote camera device. At this point video streaming begins from the remote camera device. Assuming the remote camera device is mobile, there is now a much wider range of objects, scenes, and the like that are outside the local camera's FOV that can be sent via the video call. As noted above, the only requirement is that the remote camera device remains within and connected to the LAN or subnet in which the local host, now functioning as a local endpoint proxy, is connected to. The video originating from the remote camera device is transmitted via the LAN/subnet to streaming protocol module 312 in the endpoint proxy and transmitted from there to the remote endpoint host as shown in step 408.

At some point the local user wants to switch back to the local camera, for example, the camera on the TV. The user can enter instructions on the local host device, such as selecting "Local Camera" from a pop-up menu on the screen. Once this instruction is received by camera manager module 316, the video stream from the remote camera ends and control data is sent to local camera controller 310. Terminating the streaming app on the mobile device would also cause camera manager module 316 to switch back to the local camera. Again, here camera manager module 316 functions as a toggling component. At step 412 one or both of the users end the video chat.

FIG. 5 is a flow diagram of a process for a video call with a local endpoint proxy that does not have a local camera in accordance with one embodiment. As with FIG. 4, the process begins with a video chat in progress. The local user is using a local host device that does not have a camera so no video is being transmitted to the remote user. For example, the user may be using a TV that does not have a local camera, as many TVs currently do not. At step 502 the user enters instructions or makes selections from a pop-up menu of remote cameras on the local host device, thereby creating a connection to a particular remote camera. In another embodiment, the user may not enter instructions on the local host device, but instead launch a remote camera app on the camera device. In this manner, the local user experience is shifted from the TV to the cell phone, which may be a more intuitive or natural way for the local user to utilize the present invention. This is particularly true in cases where the TV or other host device does not have a camera and the user is not accustomed to making any camera-related selections on the TV. Instead, since the user may use, for example, a cell phone or other mobile device as a video source, it would be more intuitive for the user to launch the remote camera app on the phone or device itself.

At step 504 video streaming begins from the remote camera to the local endpoint proxy in the same manner as described above. The primary difference here compared to the process in FIG. 4 is that the local host device does not have the local camera-related components, such as controller 310, encoder 308, and the like. Camera manager 316 does not have to perform a toggling function. At step 506 the local endpoint proxy transmits the video from the remote camera to the remote host device. In this manner, the TV or other device that does not have its own camera but is connected to a public network (Internet) can send video to a remote host device thereby enabling all the benefits of a video call. At step 508 the local user closes the app on the remote camera and ends the video stream to the local host device. The user may also end the video stream by unselecting the remote camera from the local host device.

Figure 6:
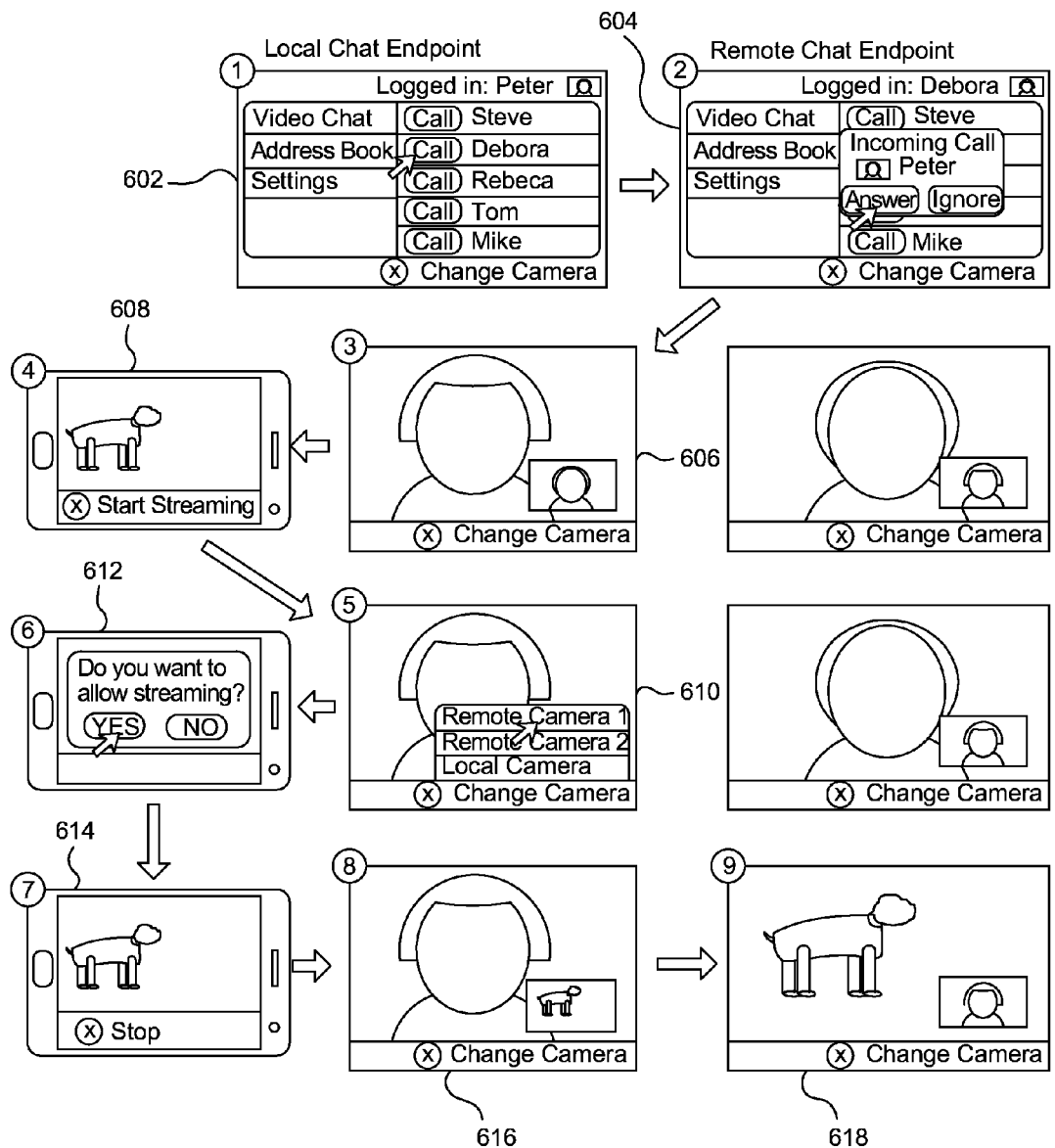
FIG. 6 is a series of screen shots illustrating the user experience of a video call using a remote camera device as a video source in accordance with one embodiment.

FIG. 6 is a series of screen shots illustrating the user experience of a video call using a remote camera device as a video source in accordance with one embodiment. There are three columns of displays for three different devices. The right column of screen shots is from a remote endpoint host device. These screen shots are shown on the TV, computer, or mobile device of a user being called. The middle column shows screen shots of a local endpoint host device used by a caller to initiate a video call. In this embodiment, the local host device has a camera. The left column is of screen shots shown on a mobile device that functions as a remote camera device. The process starts with the local user (person initiating the video call) launching the video chat application, for example Skype, on the local host device. The caller selects video chat and the person she wants to call (remote user) as shown in screen display 602. The request or call is sent to the remote endpoint host device and the remote user sees the "incoming call" from the local user. As shown in display 604, the remote user selects "Answer" on the screen display thereby accepting the request or call and creating a connection between the two endpoint devices. Video streaming may now begin between the two devices as shown in display 606. In one embodiment, if the local endpoint device does not have a camera, the remote host device will not see a video of the local caller at this stage.

The local user is interested in showing the remote user something that is out of the FOV of the local host device camera. The local user launches a remote camera application on her mobile device as shown in screen shot 608. Once the remote camera app is launched, the object outside the FOV of the local host device camera is shown (in this example, a dog).

The local user then turns her attention to the local host device and selects "Change Camera" on the local host screen. This causes a pop-up menu of remote camera devices that have been discovered in the LAN/subnet to appear on the local host device as shown in 610. The local user selects the remote camera device on the local host device screen. In this illustration, it is "Remote Camera 1." In some cases, there may only by one remote camera device selection and if the host device does not have a camera, the "Local Camera" option will not appear. Once the local user selects the appropriate remote camera device, a connection is made between the remote camera and the local host device.

In one embodiment, the remote camera device can prompt the local user asking whether she wants to allow streaming of the video taken on the remote camera to the local host device as shown in screen shot 612. This may be a desirable security feature to ensure that users are aware that video taken on one device is being shown on one or more other devices, in this case, including a remote device not on the local network. For example, the local user (person initiating the video call) may not be the person launching the remote camera application on the camera. A different person (for example, another person holding the mobile device outside the house in a yard still within the local network) may be taking the video and is the appropriate person to allow the video streaming from his smart phone to begin. The user is asked "Do you want to allow streaming?" and selects "Yes" to begin streaming from the remote camera device. Once the local (or other) user makes this selection, video streaming from the remote camera device to the local endpoint host device begins as shown in screen shot 614 of the remote camera. At screen 616 the local host device switches cameras (done when the user allowed streaming from the remote camera device) to the remote camera and begins streaming to the remote endpoint host device, as shown in screen shot 618 shown on the remote host device. Here the video of the local user is replaced with a video of the dog taken by the remote camera device. At this stage the local host device is now functioning as a local endpoint proxy device since it is essentially a proxy for the remote camera device with respect to video data.

Figure 7A:
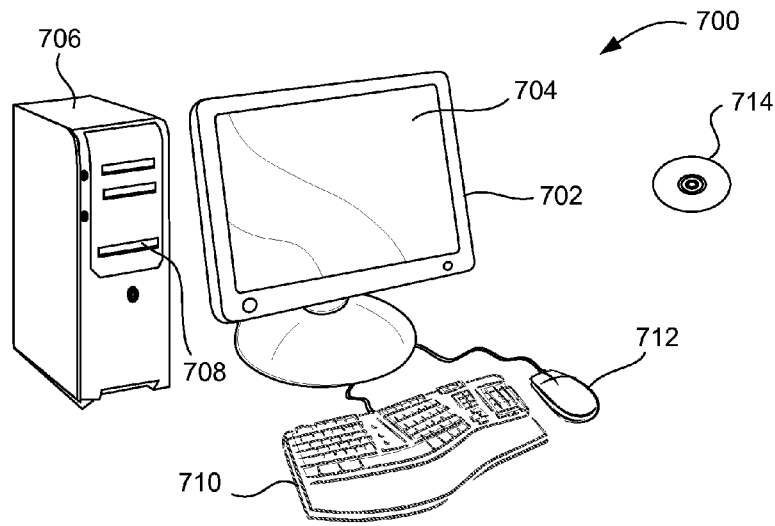
FIGS. 7A and 7B are diagrams of a computing device suitable for implementing embodiments of the present invention.
Figure 7B:
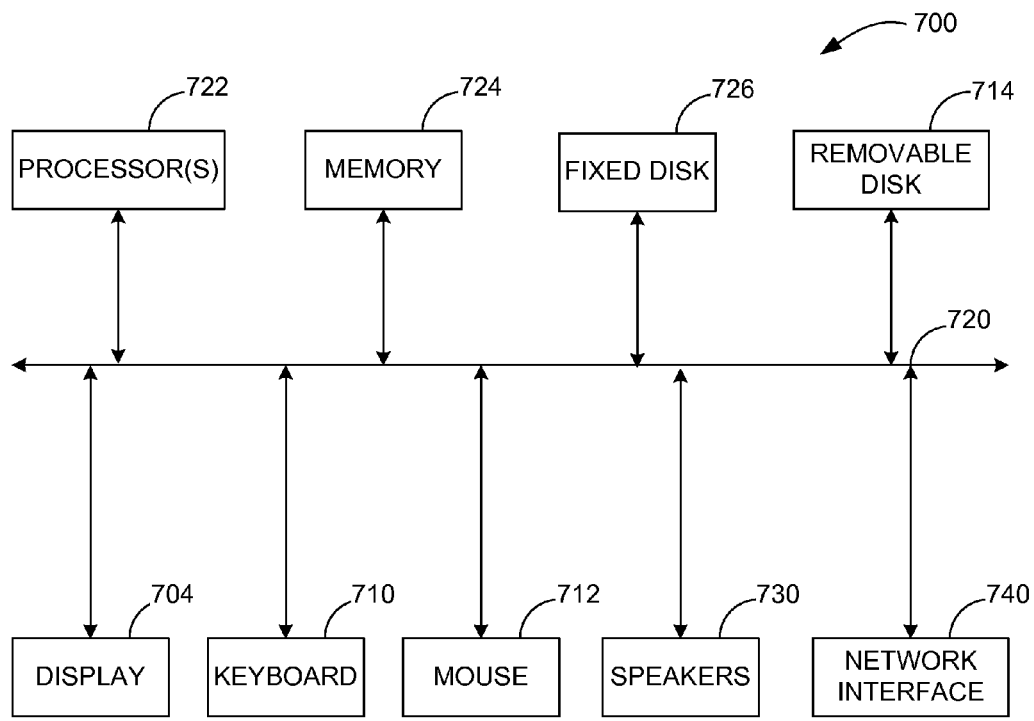

The local and remote endpoint host devices and the remote camera may be described generally as computing devices having some of the basic components of a computer. As noted above, the computing devices may be, for example, a smart phone, a tablet computer, a mobile device, a TV, a PC or laptop computer, or a surveillance camera. FIGS. 7A and 7B illustrate a generic computing system 700 suitable for implementing specific embodiments of the present invention. Some of the devices that can be used in the present invention may have other features or components that are not shown in FIGS. 7A and 7B and not all the components shown in these figures (e.g., the keyboard) are needed in the offsite or onsite devices for implementing the present invention. As such, FIG. 7A shows one possible physical implementation of a computing system. In one embodiment, system 700 includes a display or screen 704. This display may be in the same housing as system 700. It may also have a keyboard 710 that is shown on display 704 (i.e., a virtual keyboard) or may be a physical component that is part of the device housing. It may have various ports such as HDMI or USB ports (not shown). Computer-readable media that may be coupled to device 700 may include USB memory devices and various types of memory chips, sticks, and cards.

FIG. 7B is an example of a block diagram for computing system 700. Attached to system bus 720 is a variety of subsystems. Processor(s) 722 are coupled to storage devices including memory 724. Memory 724 may include random access memory (RAM) and read-only memory (ROM). As is well known in the art, ROM acts to transfer data and instructions uni-directionally to the CPU and RAM is used typically to transfer data and instructions in a bi-directional manner. Both of these types of memories may include any suitable of the computer-readable media described below. A fixed disk 726 is also coupled bi-directionally to processor 722; it provides additional data storage capacity and may also include any of the computer-readable media described below. Fixed disk 726 may be used to store programs, data and the like and is typically a secondary storage medium that is slower than primary storage. It will be appreciated that the information retained within fixed disk 726, may, in appropriate cases, be incorporated in standard fashion as virtual memory in memory 724.

Processor 722 is also coupled to a variety of input/output devices such as display 704 and network interface 740. In general, an input/output device may be any of: video displays, keyboards, microphones, touch-sensitive displays, tablets, styluses, voice or handwriting recognizers, biometrics readers, or other devices. Processor 722 optionally may be coupled to another computer or telecommunications network using network interface 740. With such a network interface, it is contemplated that the CPU might receive information from the network, or might output information to the network in the course of performing the above-described method steps. Furthermore, method embodiments of the present invention may execute solely upon processor 722 or may execute over a network such as the Internet in conjunction with a remote processor that shares a portion of the processing.

In addition, embodiments of the present invention further relate to computer storage products with a computer-readable medium that have computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs and holographic devices; magneto-optical media such as floptical disks; and hardware devices that are specially configured to store and execute program code, such as application-specific integrated circuits (ASICs), programmable logic devices (PLDs) and ROM and RAM devices. Examples of computer code include machine code, such as produced by a compiler, and files containing higher-level code that are executed by a computer using an interpreter.

Although illustrative embodiments and applications of this invention are shown and described herein, many variations and modifications are possible which remain within the concept, scope, and spirit of the invention, and these variations would become clear to those of ordinary skill in the art after perusal of this application. Accordingly, the embodiments described are illustrative and not restrictive, and the invention is not to be limited to the details given herein, but may be modified within the scope and equivalents of the appended claims.

What we claim is:

1. A method of obtaining video for making a video call on a local host device having a camera, the method comprising:
   streaming a first video stream to a remote host device from a local host device, said first video stream captured using a local camera on the local host device;
   receiving a first signal from a user at the local host device to switch to a remote camera device while using the local host device;
   establishing a connection to a remote camera device from the local host device;
   receiving a second video stream from the remote camera device by the local host device; and
   transmitting the second video stream to the remote host device from the local host device.

2. The method of claim 1 further comprising:
   displaying a remote camera device selection on the local host device.

3. The method of claim 1 further comprising:
   transmitting remote camera device commands to the remote camera device, said commands resulting from varying network conditions.

4. The method of in claim 3 wherein said commands include instructions to send more or fewer frames per second and more or fewer bits per frame from the remote camera device to the local host device.

5. The method of claim 1 further comprising:
   toggling between the local camera on the local host device and the remote camera device.

6. The method of claim 1 wherein the first signal is sent from the remote camera device.

7. The method of claim 1 wherein local host device is connected to a wide area network which enables connection to the remote host device.

8. The method of claim 1 wherein the local host device is discovered on a network by the remote camera device.

9. The method of claim 1 wherein functionality of streaming the second video stream is performed on the remote camera device.

10. The method of claim 1 further comprising:
    switching to the camera on the local host device when a streaming app on the remote camera device is terminated.

11. The method of claim 1 further comprising:
    transmitting control data to the remote camera device including device control and stream control.

12. The method of claim 1, wherein the local host device and the remote camera device are both simultaneously connected to a local network, and the remote host device connects to the local host device through a wide area network.

13. A method of obtaining video for making a video call on a local endpoint device that does not have a camera, the method comprising:
    conducting a video call between a local endpoint device and a remote endpoint device;
    launching a remote camera app on a remote camera device for connecting to the remote camera device from the local endpoint device;
    receiving a video stream from the remote camera device by the local endpoint device;
    transmitting the video stream from the local endpoint device to the remote endpoint device, wherein the local endpoint device functions as a local endpoint proxy for the video call using the remote camera device;
    disconnecting from the remote camera device; and
    terminating the video call with the remote endpoint device.

14. The method of claim 13 further comprising:
    displaying a remote camera device selection on the local endpoint device.

15. The method of claim 13 further comprising:
    transmitting remote camera device commands to the remote camera device, said commands resulting from varying network conditions.

16. The method of claim 15 wherein said commands include instructions to send more or fewer frames per second and more or fewer bits per frame from the remote camera device to the local endpoint device.

17. The method of claim 13 wherein the local endpoint device and the remote camera device are connected to a wide area network which enables connection to the remote endpoint device.

18. The method of claim 13 wherein the local endpoint device is discovered on a network by the remote camera device.

19. The method of claim 13 further comprising:
terminating the video call on the local endpoint device when a streaming app on the remote camera device is terminated.

20. The method of claim 13, wherein the remote camera device and the local endpoint device are both connected to a local network.

21. A local endpoint host having a local camera comprising:
a streaming protocol module to implement video chat on the local endpoint host and to receive video from a remote camera device;
a local encoder to receive video from a local camera driver and a local camera controller, and to encode raw video according to specific parameters;
a camera manager module to transmit control signals to the local camera controller and to a remote camera controller, wherein the camera manager module enables switching between the local camera and the remote camera device using the local endpoint host; and
a control protocol module to transmit control signals to the remote camera device over a local network.

22. The local endpoint host of claim 21 wherein the control signals include remote camera device control and video stream control.

* * * * *